Feb. 25, 1936.  P. A. NOXON  2,031,976
SYNCHRONIZING SYSTEM
Filed Oct. 12, 1934   7 Sheets-Sheet 1
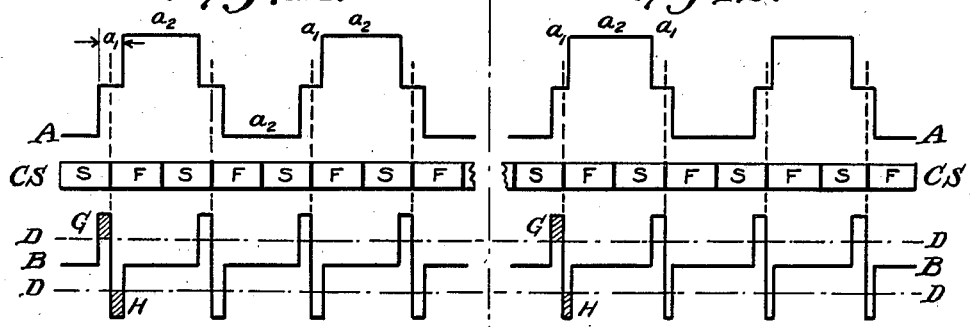
A = Voltage at Corrector Relay Tongue ($a_1$ = Travel time)
CS = Correcting Segments
B = Voltage applied at Relay side of Neon Lamp (referred to ground)
D = Cut-off voltage of Neon Lamp
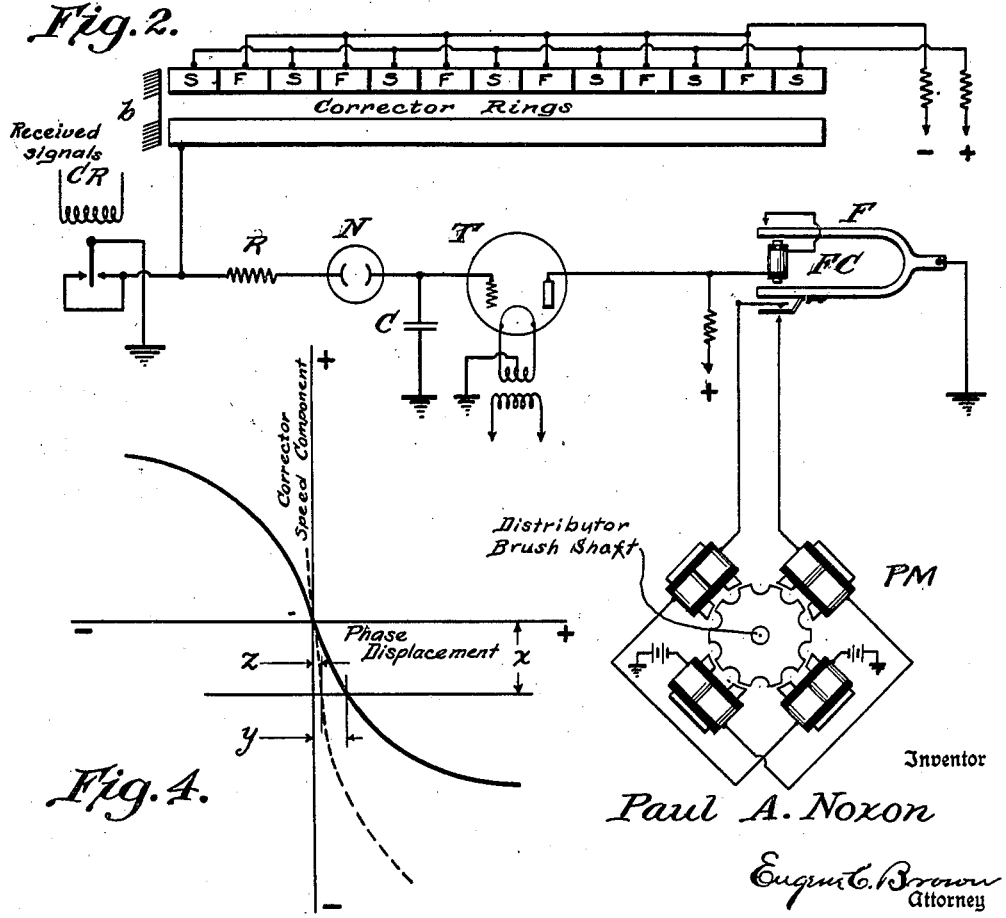
Inventor
Paul A. Noxon
Eugene C. Brown
Attorney Feb. 25, 1936.  P. A. NOXON  2,031,976

SYNCHRONIZING SYSTEM

Filed Oct. 12, 1934      7 Sheets-Sheet 2

$R_1 C_1 < R_2 C_2 < R_3 C_3$
$R_4 > R_5 > R_6$
$N$ = Negative glow lamps $W_0 = \text{Tan } \alpha$
$W_1 = \text{Tan } \beta$ Graph of equation $y = t^a$ for different values of $a$.

Inventor
Paul A. Noxon
Eugene E. Brown
Attorney

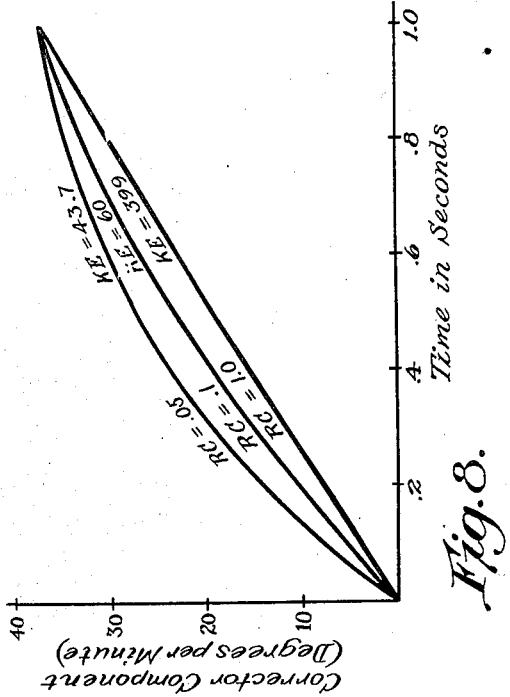
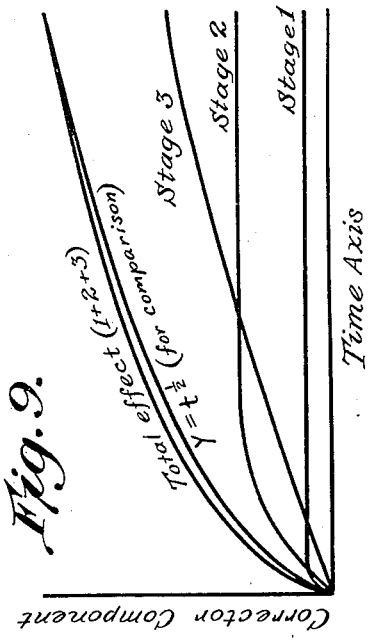
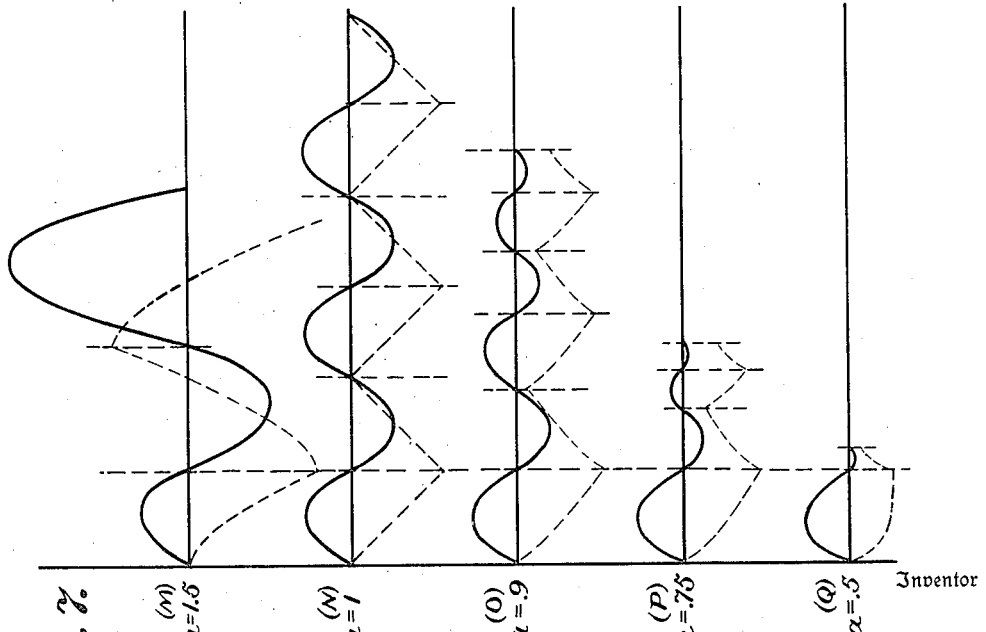

$C_1 < C_2 < C_3$
$R_1 < R_2$

Inventor
Paul A. Noxon
Eugene C. Brown
Attorney

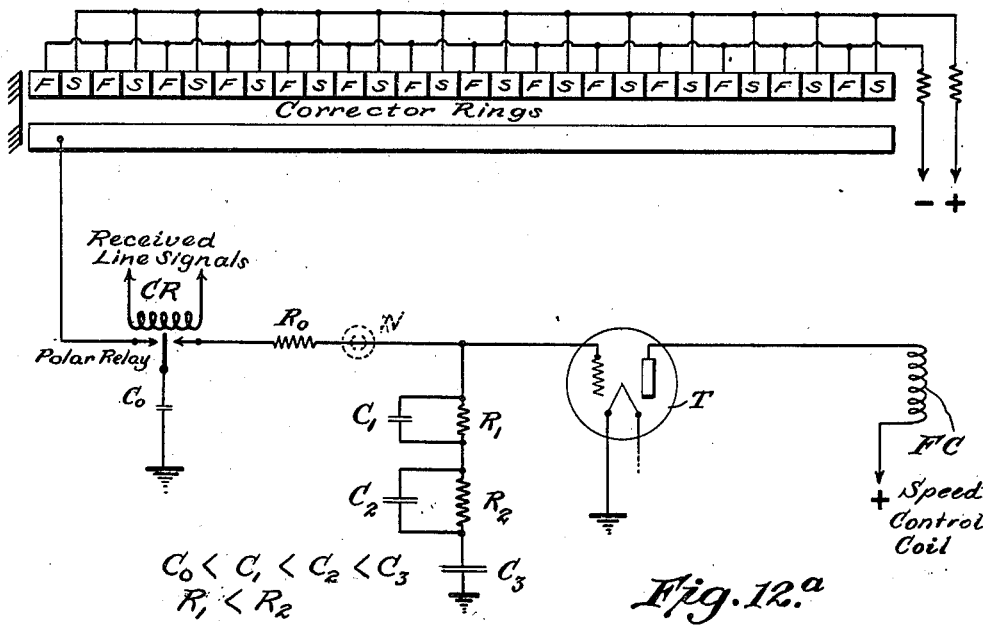
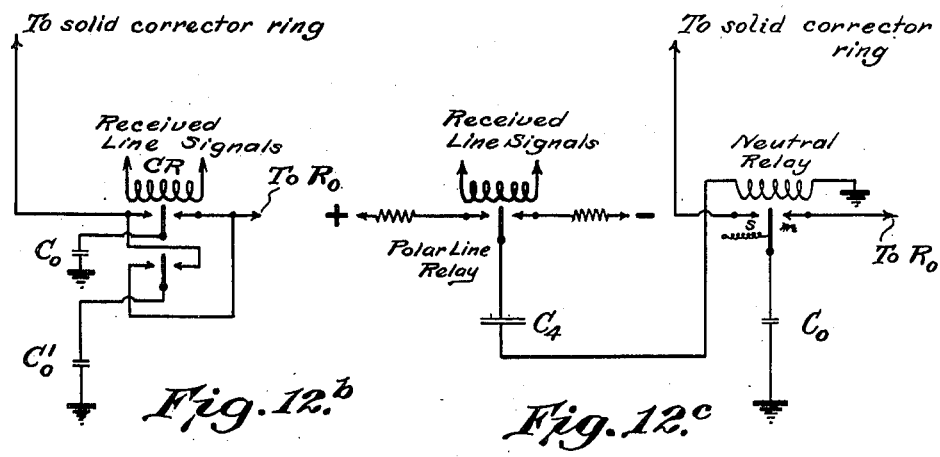

Feb. 25, 1936.                P. A. NOXON                2,031,976
                         SYNCHRONIZING SYSTEM
                         Filed Oct. 12, 1934          7 Sheets-Sheet 6

Inventor
Paul A. Noxon
Eugene E. Brown
Attorney

Feb. 25, 1936.   P. A. NOXON   2,031,976
SYNCHRONIZING SYSTEM
Filed Oct. 12, 1934    7 Sheets-Sheet 7

Inventor
Paul A. Noxon
Eugene C. Brown
Attorney

Patented Feb. 25, 1936

2,031,976

UNITED STATES PATENT OFFICE 2,031,976

SYNCHRONIZING SYSTEM

Paul A. Noxon, Bergenfield, N. J., assignor to The Western Union Telegraph Company, New York, N. Y., a corporation of New York Application October 12, 1934, Serial No. 748,122

15 Claims. (Cl. 178—53)

This invention relates to synchronous communication systems and particularly to high speed printing telegraph systems.

The object of the invention is to continuously maintain synchronism between the transmitting and receiving apparatus located at distant stations by a continuous electrical correction means wherein correcting impulses are employed when a departure from synchronism occurs, to control the input of a vacuum tube amplifier, the output of the amplifier operating to vary the frequency of a vibrating fork which controls the speed of the rotary distributor motor.

A more specific object of my invention is to overcome the considerable "wandering" of the phase position of the distributor brushes which occurs in corrector systems of the type above referred to when the current reversals occur at comparatively infrequent intervals; also to obviate too violent changes in the frequency of the fork and in the speed of the phonic motor which drives the distributor and to maintain a high degree of stability under all conditions.

In the following description of my invention and of the underlying principles, I shall refer to the accompanying drawings, in which:—

Figure 1A is a schematic diagram illustrating the equal impulses of opposite polarity transmitted to the corrector when the distributor brushes are in exact phase relation with the incoming signal impulses;

Figure 1B is a similar diagram showing the conditions when the brushes are slightly displaced in phase;

Figure 2 is a diagram illustrating a corrector system of the type upon which the present invention is an improvement;

Figure 3:
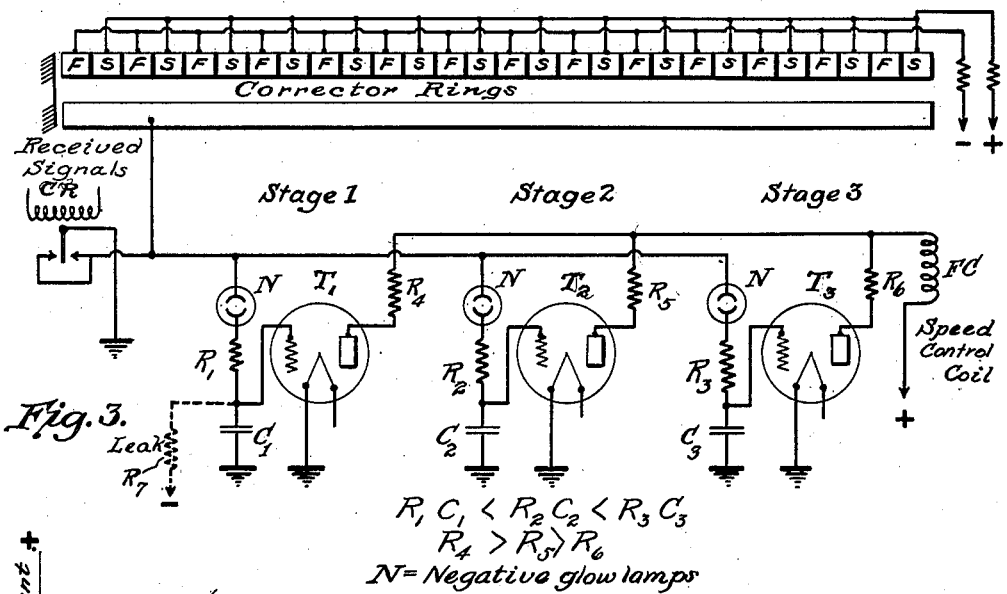
Figure 3 is a diagram of a corrector system embodying my invention.
Figure 10:
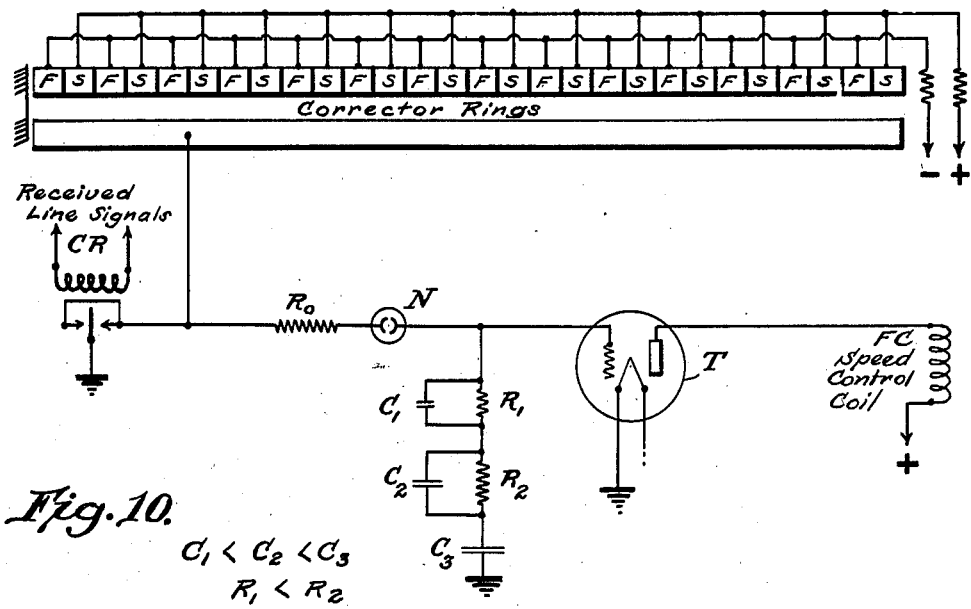
Figure 13:
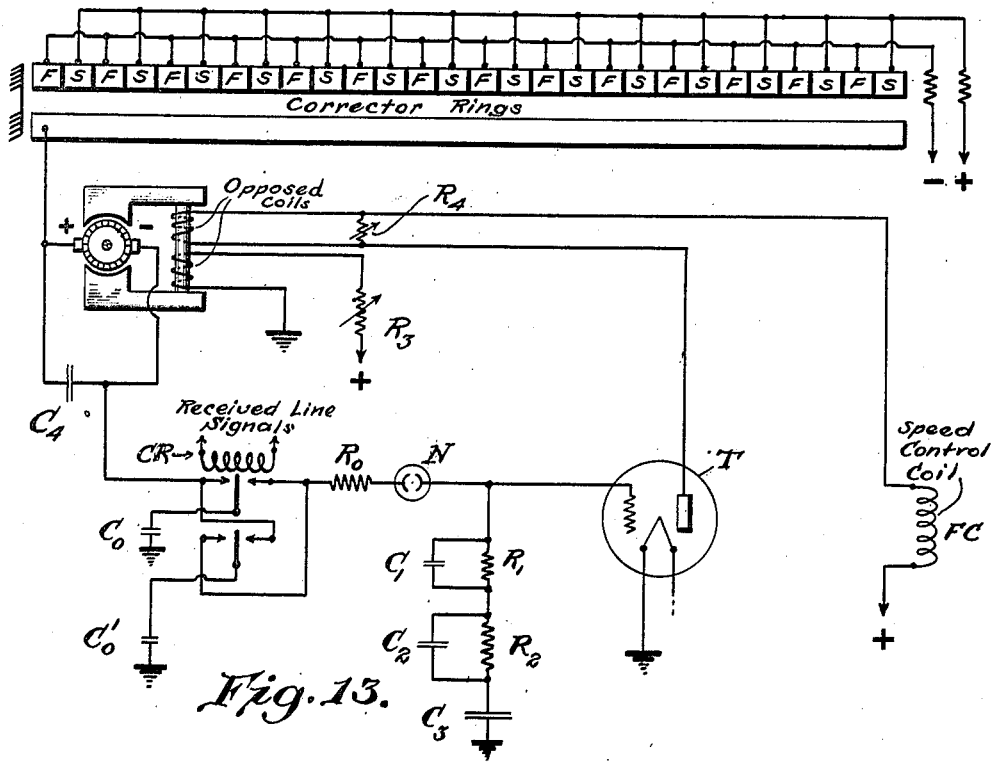
Figure 15:
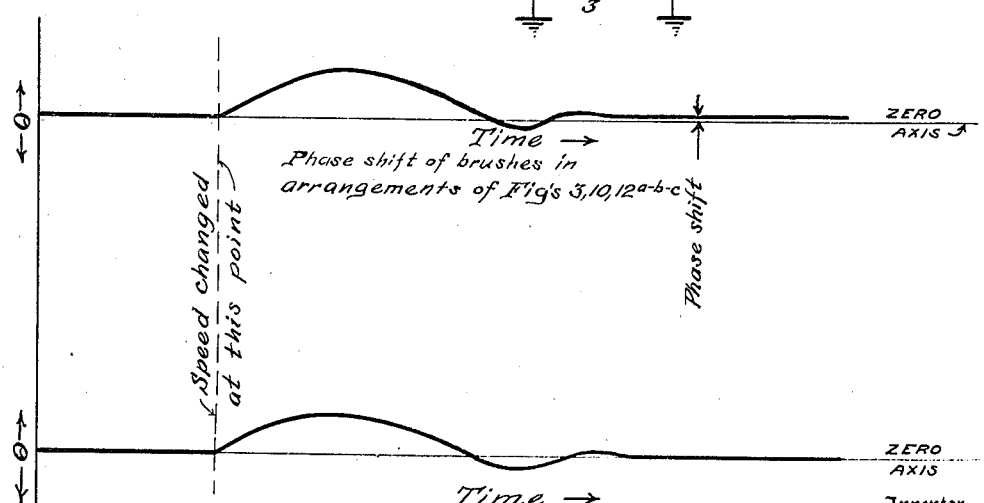

Figures 4 to 9, inclusive 11 and 14 are graphical explanatory diagrams to show the relation of the component corrector elements and the manner in which they are combined to accomplish the results produced by the present invention;

Figures 10, 12ª, 12ᵇ, 12ᶜ, 13, and 16 are modifications showing other embodiments of my invention; and Figure 15 is a graphical explanatory diagram illustrating the brush phase shift in response to a change of speed in the modification shown in Fig. 13 compared to that shown in Figs. 3, 10, 12ª, 12ᵇ, and 12ᶜ.

This invention pertains to a corrector system which averages the corrector impulse reversals (i. e. has an accumulative effect) and applies a component of speed to the driving motor which is some function of the phase displacement of the distributor brushes from zero position, the sign of such component being opposite to the sign of said displacement.

Before taking up in detail the factors which produce the defects or limitations in prior corrector arrangements above mentioned, I shall briefly enumerate the requirements necessary to overcome said limitations to any reasonable degree as follows:—

1. The system should maintain the distributor brushes in a given phase relationship (nominally zero) with respect to the average received current reversal in such a way that this relationship is (ideally) constant under all conditions of interference and fundamental speed relationship between the transmitting and receiving prime movers.

2. The system should be highly damped (i. e., oscillations consisting of a periodic interchange of accumulated phase displacement and accumulated corrector speed component should be damped out in a few half cycles if the system is to be stable.)

3. The system should be stable when the frequency of the received reversals becomes low.

In discussing the inter-relation between the above requirements in a correcting system I shall refer to the corrector arrangement shown in Fig. 2. The corrector rings and rotating brush b of the distributor operate in conjunction with the polar correcting relay CR, which responds to received signals, to deliver small incremental impulses to a condenser C for every operation of the relay armature. The alternate segments of the corrector ring are marked F and S, respectively, to indicate the fast or slow correction component which is transmitted to the correction circuit. When the brush b is passing over a "fast" segment F during the travel time of the relay armature, a negative polarity impulse is impressed upon the condenser C, and when the brush is passing over a "slow" segment S during the relay travel time, a positive polarity impulse is transmitted to the condenser. The neon tube N serves to determine the minimum voltage of the impulses impressed upon the condenser and isolates the condenser during the interval between successive impulses, thus causing the condenser to function as an accumulator to average the successive incremental charges.

It will be evident that the potential across the condenser will not change when there are an equal number of positive and negative incremental pulses per unit of time. When, however, a preponderance of positive or negative polarity impulses is received, the potential across the condenser is either added to or subtracted from the normal grid biasing potential.

Figure 1A indicates steady-state condition in which the speed of the distributor is exactly in synchronism with the incoming signal impulses and the brush $b$ is in proper phase relation. During the travel time of the armature of the corrector relay, indicated at $a$ on the curve A of received signals, the corrector brush passes over equal portions of the F and S segments and hence equal positive and negative impulses are transmitted to the condenser C, as indicated by the equal areas G and H. Hence the voltage across the condenser is zero and consequently the tube T draws a medium value of current through the coil FC, thereby holding the speed of the driving phonic motor PM constant in its matched or centered condition.

In correcting conditions illustrated graphically in Fig. 1B, it is assumed that the fundamental speed of the fork F has been increased so that the tube T is required to draw more current to keep the fork frequency matched in exact synchronism with the incoming signal impulses. As indicated in the diagram the brushes have shifted in phase with respect to the received signals so that the area G is now greater than the area H, thereby supplying the required positive potential to the condenser. Assuming steady state conditions, it will be observed that the condenser is charged to such a potential that the integral ($\int i dt$) of charging current during the voltage-time area G is equal to $\int i dt$ of discharge current during the lesser area H. Hence, the condenser is maintained at a steady potential, more positive than under the conditions indicated in Fig. 1A, and thus by virtue of the control exerted by the grid, supplying the increased plate current originally required.

The conditions above described are portrayed graphically in Fig. 4, wherein the corrector speed component is represented as an arbitrary function of phase displacement. The distance X is the corrector speed component required under the steady-state conditions shown in Fig. 1B and the distance $y$ is the phase shift necessary to supply it.

As noted under "requirement 1", this shift in phase is an undesirable feature, since it entails re-orientation of the selector segments to maintain a centered range condition. It is obvious that this shift could be reduced by employing a more potent corrector (i. e., one furnishing a greater unit speed change per unit phase displacement). This is indicated graphically in Fig. 4, by means of the dotted line curve. With this new curve, the speed component required in Fig. 1B may be obtained with a relatively small shift in phase (distance $z$ in the figure). It is quite obvious that the more potent the system can be made, the more closely the ideal expressed in "requirement 1" will be approached.

Let us now apply these conditions to the correcting arrangement of Fig. 2 to determine what limitations interfere with a realization of the above-mentioned requirements. It may be assumed that the fork coil FC can be made as potent as required. In order to satisfy "requirement 3", it is obvious that the effect of a single reversal must still be made very small, otherwise when these reversals occur at comparatively infrequent intervals, considerable "wandering" of the phase position of the brushes will occur between successive reversals. Furthermore, as the fork is required to drive a phonic motor, too violent changes in speed are not conducive to steady operation of the distributor. The values of the resistance R and the condenser C must, therefore, be increased until "requirement 3" is satisfied.

The value of RC cannot be increased with impunity, since with large values the system will fail to meet "requirement 2". This can best be shown by a mathematical demonstration.

Figure 5:
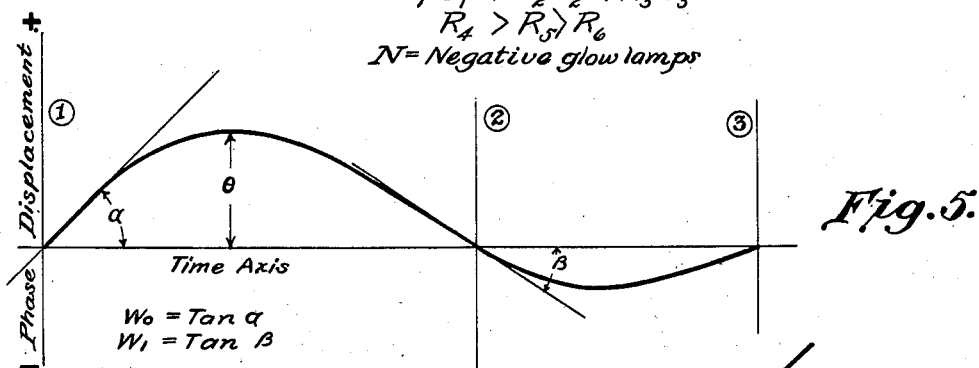
Figure 6:
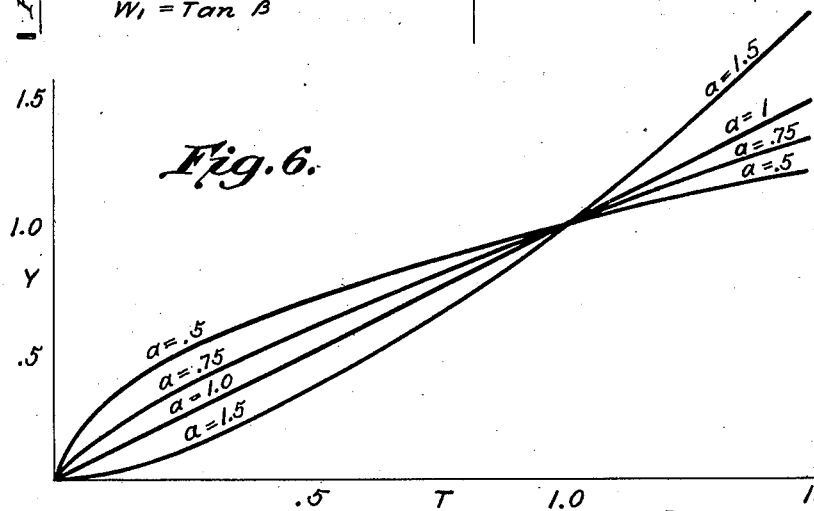

Since experience indicates that the conclusions based on the following considerations are correct, we shall, for simplicity, consider perfect signals being received, and also that the relay travel time is so short that the entire pulse falls on either a "fast" or "slow" correcting segment. Furthermore, we shall consider only a single half cycle, each successive half cycle requiring a new set of constants in the equation. Figure 5 represents the condition we are trying to investigate. It is assumed that (at axis ①) the brushes are drifting at a rate $W_0$ with respect to the received signals. The condenser gradually builds up in voltage, consequently altering the rate of drift until (at axis ②) the phase displacement has been restored to zero. We have, however, accumulated too great a voltage, and therefore, a negative drift, in the process. The sequence is, therefore, repeated (from axis ② to axis ③) continuing until the amplitude is reduced to a negligible amount. It is evident that if the oscillations thus brought about are to be damped, the slope $W_1$, or accumulated difference in speed when the phase displacement $\theta$ is restored to zero, shall be less than the original rate of drift $W_0$. It is evident that the nearer $W_1$ approaches equality with $W_0$, the longer will the oscillations continue.

While it is possible to set up and integrate a differential equation, describing the action of the corrector, based on the expression for voltage across a condenser as it is being charged through a resistance.

$$\left[\text{namely, } V = E\left(1 - e^{\frac{-t}{RC}}\right)\right]$$

the equation so obtained does not readily lend itself to a solution for $W_1$, being too complicated for literal treatment. We may, however, assume the corrector component to vary according to some general law which will yield a simple solution, and interpret the effect of a given set of constants in the actual system by comparison with the solution for the theoretical corrector.

The general law which we assume should represent a series of curves having different properties, such as:

$$W_c = K t^a$$

Where $W_c$ = corrector component
$K$ = a proportionality constant
$t$ = time (or reversals)

This represents a group of exponential curves varying from curves concave upward (when exponent $a$ is greater than unity) through a straight line ($a=1$), to curves concave downward (positive values of $a$ less than unity.) (See Fig. 6.)

Since the constants are known, let us for simplicity set up our differential equation as an equation of slopes. In Figure 5 it is evident that the slope at any point $$\left(\frac{d\theta}{dt}\right)$$

is equal to the original slope ($W_0$) minus the corrector component at the same instant ($W_c$).

We may then equate these quantities as follows:

$$\frac{d\theta}{dt} = W_0 - W_c \quad (1)$$

but $$W_c = Kt^a$$

or $$\frac{d\theta}{dt} = W_0 - Kt^a \quad (2)$$

Integrating, we get:

$$\theta = W_0 t - \frac{Kt^{(a+1)}}{(a+1)} + c$$

[When $t=0$; $c=\theta_0$]

or:

$$\theta = \theta_0 + W_0 t - \frac{Kt^{(a+1)}}{(a+1)} \quad (3)$$

Referring to Figure 5, let us make $\theta_0$, the initial displacement, zero; and solve for the time $t$ when $\theta$ is restored to zero at axis ②.

$$0 = 0 + W_0 t - \frac{Kt^{(a+1)}}{(a+1)} \quad (4)$$

or:

$$W_0 t = \frac{Kt^{(a+1)}}{a+1}$$

Dividing through by $t$ $$t\left[W_0 = \frac{Kt^a}{(a+1)}\right]$$

Whence:

$$t = 0 \quad [\text{at axis ①}]$$

Also:

$$W_0 = \frac{Kt^a}{(a+1)} \quad (5)$$

Or:

$$t^a = \frac{W_0(a+1)}{K}$$

Whence:

$$t = \left[\frac{W_0(a+1)}{K}\right]^{\frac{1}{a}} \quad [\text{at axis ②}] \quad (6)$$

Now since we wish to find the value of $W_1$, let us substitute this value of $t$ (Equation 6) in Equation (2):

$$\frac{d\theta}{dt} = W_1 = W_0 - K\left\{\left[\frac{W_0(a+1)}{K}\right]^{\frac{1}{a}}\right\}^a \quad (7)$$

Or:

$$W_1 = W_0 - K\left[\frac{W_0(a+1)}{K}\right] \quad (8)$$

$$\therefore W_1 = W_0 - aW_0 - W_0$$

Or:

$$W_1 = -aW_0 \quad (9)$$

From Equation (9) it will be seen that in order for $W_1 < W_0$, $a$ must partake of such a value that the curve of corrector component as plotted against time (i. e., net reversals) must be concave downward, the degree of such curvature determining the amount of damping present.

To further clarify the above, let us refer to Figure 7 which is a set of curves similar to Figure 5 except that they have been obtained by plotting Equation (3) with different values of $a$. The variation in corrector component in each case is shown by the dotted curves.

In curve (M) the corrector component is assumed to be a curve concave upward (when positive), and hence, the oscillations are negatively damped.

In curve (N) the corrector component is assumed to be linear, making $W_1 = -W_0$, hence no damping.

Curves (O), (P), and (Q) illustrate the effect of varying degrees of curvature in the corrector component curve, which is assumed to be concave downward (when plotted as positive).

In order to compare the actual system with the above, let us set up the expression for corrector component corresponding to ($W_c = Kt^a$) in the theoretical system.

As mentioned before, the expression for the voltage across a condenser at any time $t$, when it is being charged through a resistance R across a potential E is given by:

$$V = E\left(1 - e^{\frac{-t}{RC}}\right) \quad (10)$$

But since the voltage is not applied steadily in this case, we multiply $t$ by a constant $m$ which fixes the time scale in accordance with the relay travel time and frequency of the incoming reversals, making the expression become:

$$V = E\left(1 - e^{\frac{-mt}{RC}}\right) \quad (11)$$

Furthermore, if we assume the tube characteristic and fork coil to be linear in effect, we may express the corrector component as follows:

$$W_c = KE\left(1 - e^{\frac{-mt}{RC}}\right) \quad (12)$$

where $W_c$ = corrector component
$K$ = a proportionality constant

We can now plot this equation for different values of RC (Fig. 2), bearing in mind that as RC is increased the potency (KE in Equation 12) must be correspondingly increased, in keeping with the adjustments that would be made in the actual circuit, for the reasons previously discussed. Perhaps the most reasonable values are those which will make all curves reach a predetermined level of corrector component in the same time.

Figure 8 is a set of curves so obtained, all reaching the same level in one second.

It will be noted from the figure that the curve is the right type to provide damping, as developed above, but as RC and KE become increasingly large, the curve approaches very closely to a straight line. This is, as we know, an unstable condition (see Figure 7 (N)).

In comparing the corrector system shown in Fig. 2, with the theoretical corrector, the resistance in series with the condenser was treated as a constant in Equations 10, 11 and 12, supra. This is not strictly correct, since it includes the resistance of the neon lamp, which is some inverse function of the current through it, being small when the current is large, and vice versa.

To include this variable factor in Equation 12, would introduce, however, unnecessary complications. It will be readily understood that, when in response to a shift in phase, the polarity of the pulses furnished by the exciting circuit become reversed, the difference in polarity across the terminals of the neon lamp will then be greatest (since C will have been previously charged in the opposite direction). This means that a greater amount of current will flow through the neon lamp at this time, and its resistance will be correspondingly lowered. Since this is just the time when we want the potential across C to be changed most rapidly to provide the desirable characteristic, it follows that the effect of the varying resistance of the neon lamp is beneficial.

When R and C are increased to large values, however, this effect is almost completely masked by the large value (several megohms) of resistance which must be connected in series with the lamp.

Having set forth the basic principles which cause the limitations of prior correcting systems, I shall now describe a method by which I am able to obtain a potent correcting system and at the same time retain a high degree of stability. It has been shown that in order to achieve a stable system and at the same time have a large accumulative effect, some method must be employed to shape properly the curve of corrector component as plotted against time or net reversals. I accomplish this purpose by employing a series of corrector elements similar to that shown in Fig. 2, the elements in the series having progressively greater time constants and progressively greater potency.

A schematic diagram of my corrector system with three stages is shown in Figure 3. Since $R_3 C_3$ is greater than $R_2 C_2$, which is in turn greater than $R_1 C_1$, it follows that stage I responds more quickly than stage 2 which in turn responds more quickly than stage 3. Also since $R_4$ is greater than $R_5$ which is in turn greater than $R_6$, the correcting effect of stage I upon the fork coil or speed control element FC, is smaller than that of stage 2, which is in turn less potent than stage 3. The manner in which this arrangement combines to produce the proper curve is shown in Figure 9, which is intended to illustrate how the combined effects of the three stages approximates the theoretically desirable condition. It is assumed in the figure that a long series of reversals are falling entirely on plus segments, causing the grids of all stages to acquire a positive potential and thus permitting the anode currents of all tubes to increase. Since the corrector component is a direct function (assumed to be linear) of current in these plate circuits, we can, therefore, plot the corrector component as a function of time as shown in the Fig. 9.

Due to the differing time constants of the different stages, as previously explained, the plate current, and therefore the corrector component furnished by each stage, increases in a manner individual to itself. Stage I (as shown) rises very quickly to a small maximum (limited by $R_4$). Stage 2 rises more slowly to a greater maximum (limited by $R_5$), while stage 3 rises very slowly to a maximum fixed by the permissible full-load capacity of the tube.

Since the three components of current pass through the same coil FC, they may not only be drawn to the same scale of corrector component but are also directly additive. The ordinates of the curve illustrating total effect are simply the ordinates of the curves for the three stages at any point added together.

The curve $y=t^{\frac{1}{2}}$, a theoretically desirable curve (see Fig. 7—Q) is plotted in Figure 9 for comparison.

It will be readily understood that, at any point on the curve of total effect in Figure 9, should the reversals begin to fall on minus segments, a new curve of total effect will be traced exactly like the one shown, except that it will be inverted (see curves of corrector component in Figure 7).

While the total effect of stage I is small compared to the others, the increment or decrement of corrector component produced by a single reversal opposite in direction to that to which $C_1$ had been charged is considerably greater than a similar effect in the other stages due to its smaller time constant. It is desirable, therefore, to provide some means of "wiping out" the corrector component of stage I when reversals are lost for a number of revolutions, since the accumulated components of stages 2 and 3 represent a better average speed and provide a better chance of maintaining the proper phase relationship. For this purpose a leak resistance $R_7$ may be provided to bring stage I to its median value under the condition named.

One advantage of my corrector system is its great flexibility. That is, if only a moderate effect were required, a single stage would be employed (since we have shown a single stage to be stable under such conditions); if a larger effect were required, two stages would be used, etc., bearing in mind that each stage added would have a greater time constant and a greater potency than the one preceding it.

My corrector system meets the requirements which were outlined at the beginning, as follows:

(a) Requirement 1 can be met by designing the speed control coil (FC) to produce as high a potency as required to keep the phase shifts within permissible values.

(b) Requirements 2 and 3 can be met by employing enough stages so that while the effect of a single reversal is kept small, the overall effect follows the proper law to provide satisfactory damping.

In the previous discussion, I have demonstrated that in order to design a stable synchronizing system which would be capable of compensating for a large change in speed differential between the two rotating elements involved (i. e., the transmitting and receiving distributors), some means must be provided to control the law according to which changes in the corrector component are to be made (expressed as a time function). I also demonstrated the manner of developing the desirable shape of this curve, in order to provide stability.

The means of control outlined in the above description embodied a series of elements, having progressively greater time constants and progressively greater potency.

In Fig. 10 I have disclosed a system employing a more simple method of accomplishing the same result. $R_0$ and $C_3$ correspond to R and C in Fig. 3, and perform the same function, i. e. $C_3$ is used to hold a grid potential corresponding to the average corrector component required, and $R_0$ limits the rate at which changes in potential of $C_3$ are made. $C_1$ and $C_2$, respectively shorted by $R_1$ and $R_2$, perform the function of controlling the time-law by which changes in grid voltage, and therefore corrector component, are effected, to conform to the theoretically desirable curve.

Figure 11:
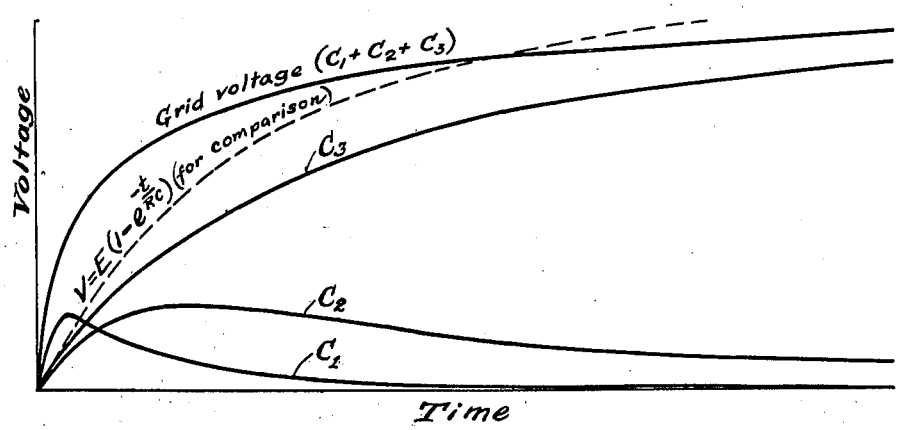

The manner in which this is accomplished is indicated in Fig. 11, wherein the voltage across the three condensers, $C_1$, $C_2$, and $C_3$ are plotted against time, it being assumed that a long series of reversals are falling on plus segments only. Since $C_1$ is small, it rises rapidly to a maximum voltage. This maximum being limited mainly by the ratio of $R_1$ to $R_0$. $C_3$, however, is gradually acquiring a positive potential, so the difference between its voltage and that available from the corrector ring (part of which difference is available for charging $C_1$) becomes gradually smaller. Since the average voltage available across $R_1$ soon becomes less than the voltage to which $C_1$ had previously been charged, it follows that $C_1$ discharges through $R_1$ at a rate fixed by the rise of voltage across $C_3$.

The voltage across $C_2$ behaves in the same manner, except that since $C_2$ is of larger value, the maximum occurs later and lasts longer than that of $C_1$. It also may or may not be greater depending on the value of $R_2$.

The voltage across $C_3$, although modified to a considerable extent by the non-linear elements of the circuit, rises approximately as though it were being charged through a simple resistance (due to the masking effect of $R_0$ which is large).

The voltage impressed on the grid of the tube is the sum of the three voltages discussed above (as shown in Fig. 11) and differs considerably from that obtained in a simple resistance capacity circuit.

It should be noted that had the polarity of the pulses been reversed at any point, a new curve of grid voltage would have been obtained exactly like that described but inverted.

By choosing proper values for the various constants and by adding additional networks of shunted condensers in series if necessary, practically any desired curve of grid voltage (and therefore corrector component) as a function of time, can be obtained within a single stage.

The circuit arrangement of Fig. 10, above described, performs another function which has not been mentioned. If at any time reversals are cut off, $C_1$ and $C_2$ are discharged through $R_1$ and $R_2$, respectively, leaving the voltage on the grid under the control of $C_3$ only. This is an advantage, since the voltage across $C_3$ represents the best available average of the corrector component required. Thus, the circuit inherently contains the function performed by the leak $R_7$ in Fig. 3.

In Fig. 12$^a$ I have shown a correcting system employing an alternative method of obtaining the correcting impulses. A small condenser ($C_0$) is connected from the tongue of the polar relay which is being operated by the incoming line signals and receives a charge from the correcting ring when the relay tongue is on the spacing contact, and discharges when the tongue is on the marking contact into $C_3$.

Since $C_0$ is very small (on the order of .01 m. f.) and is, therefore, charged practically instantaneously, it follows that it will practically at all times be fully charged whenever the polar relay tongue leaves the spacing contact, the direction of this charge being determined by the polarity which is picked up by the correcting brush at the instant the polar relay breaks contact on the spacing side.

The discharge of $C_0$ into $C_3$ results in an increment or decrement in the voltage of $C_3$, the magnitude of which depends on the ratio of their capacities, and the difference in their voltages before being connected together. Since the ratio of capacities is on the order of 500/1 it follows that such increments or decrements are very small.

While $R_0$ normally is used to reduce sparking on the marking contact of the relay, in which case it is small, it may, if desirable, be increased to a value such that $C_0$ is only partially discharged between successive reversals at the highest line frequency. When the line frequency becomes lower, $C_0$ will have time to discharge more completely between reversals, therefore making the increment of voltage on $C_3$ produced by a single reversal greater when the frequency is lower. By this means the rate at which changes in the corrector component can be effected is made to be more or less independent of the line frequency. This is an advantage, since the rate can be great enough to effectively hold synchronism at low frequencies, and still avoid violent effects when the line frequency becomes high.

If desired, a negative glow lamp N, indicated in dotted lines, can be connected in series with $R_0$ for reducing leakage in the circuit when pulses are not being delivered to $C_3$.

Damping can be provided by either of the two methods previously described, the simplified method of being shown.

It will be observed that the system of Fig. 12$^a$ corrects on reversals in one direction only. In order to take advantage of every reversal, two methods are shown. At Fig. 12$^b$ there is shown a double tongue polar relay, the tongues of which are connected to two small condensers $C_0$ and $C'_0$, the contacts being connected so that while $C_0$ is being charged, $C'_0$ is being discharged, and vice versa. A correcting impulse is thus provided at every reversal of line current, being obtained from $C_0$ and $C'_0$ alternately. At Fig. 12$^c$, is shown an alternative method employing a neutral relay provided with a biased tongue which is made to travel to marking and return to spacing every time the line relay reverses, being energized by the current impulses through $C_4$ as it is alternately charged in opposite direction. Since $C_0$ is connected to the tongue of the neutral relay, an impulse is evidently provided for every reversal of the line relay.

While the method of obtaining correcting pulses just described has been treated as the optional equivalent of the scheme covered in the arrangement of Fig. 3, its operation differs in two important respects from that of said arrangement. These differences are:

(a) A single correcting impulse per reversal is obtained as compared to two for the former arrangement shown in Fig. 3 (as when the relay travel time overlaps two correcting segments). (See Figs. #1—A and 1—B.)

(b) Under normal conditions (assuming properly matched speeds), the increments of voltage on the storage condenser produced by these impulses are not dependent on the phase displacement for their magnitude, but only for their sign, as opposed to said arrangement shown in Fig. 3 wherein the difference between the two impulses produced by a reversal furnished an increment proportional to the phase displacement.

Under certain conditions the system shown in Figure 12$^a$ may be open to one objection. If the two voltages applied to the segmented correcting ring are symmetrical with respect to the value of grid potential corresponding to median plate current, (the most desirable condition) then when the corrector is near one extreme, for example, when $C_3$ is charged to a relatively high negative value, the difference in potential between $C_0$ and $C_3$, when the polar relay goes to marking, will obviously be greater when $C_0$ comes over with a positive charge than when it comes over with a negative one. Hence, a greater change in voltage of $C_3$ will be effected by the positive impulses than by the negative impulses. If $C_3$ had been charged to a potential near the other extreme, the reverse would have been true. Intermediate conditions exhibit the same phenomenon in a lesser degree, except when $C_3$ is charged to its median value.

Now if we are to maintain a constant average potential on $C_3$, it is evident that the brushes must assume such a phase position as to permit the summation of all the incremental adjustments made in the potential of $C_3$, to be equal to zero. It therefore follows that if the increments partaking of one sign are greater in magnitude than those partaking of the other, then more of the lesser impulses per unit of time will be required to maintain equilibrium, hence this phase position will not be zero, but will depend upon the difference in frequency between the signals and the free speed of the fork.

Fig. 13 shows a method by which this objection may be overcome. The armature of a small D. C. generator is connected in series with the lead from the solid correcting ring, so that its voltage may be added algebraically to that picked up from the segmented correcting ring. It is provided with two opposing field windings, and is so designed that its maximum voltage (keeping below saturation) will be just equal to the greatest voltage to which $C_3$ may be negatively charged (keeping on the straight portion of the tube characteristic). The voltages applied to the correcting ring are symmetrical with respect to ground.

Now $C_3$ can never be held positive with respect to ground, since the tube would then draw grid current which would immediately bring it to ground potential, hence ground potential on $C_3$ represents the maximum value of plate current. $R_4$ is therefore adjusted so that under this condition the steady field is just cancelled, and the generator voltage is zero. ($R_3$ is used to regulate the maximum voltage mentioned in the preceding paragraph and should be adjusted first.) Now when the voltage of $C_3$ becomes negative, the plate current becomes less, hence the generator responds by supplying a voltage just sufficient to maintain the two voltages to which $C_0$ and $C'_0$ are charged, symmetrical with respect to the average grid voltage. The incremental changes in the voltage of $C_3$, then, (except for the transient effects of the shunted condensers) are all equal in magnitude, and $C_3$ charges and discharges linearly. $C_4$ is utilized to remove the impedance of the generator armature from the charge circuits of $C_0$ and $C'_0$.

Since the correcting impulses are thus made invariable in magnitude, changing only in sign, it follows that constant phase position (except for transient effects) will be held for any speed within the linear range of the system.

Figure 14:
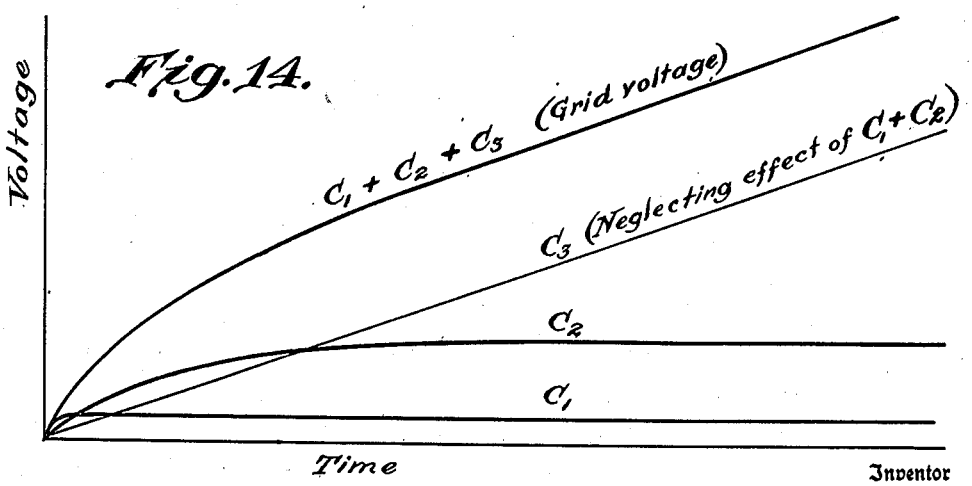

The effect of the networks of shunted condensers is somewhat modified by making the magnitude of the correcting impulse independent of the voltage of $C_3$, but they still provide damping as shown in Fig. 14. $C_1$ rises rather quickly to a small constant average value, such that the charge produced by each correcting impulse is just drained off through $R_1$ when the next impulse arrives. $C_2$ rises more slowly to a greater maximum, $R_2$ being larger. The sum of the voltages across $C_1$, $C_2$ and $C_3$ therefore combine to produce a curve of grid voltage of the right type to produce damping, as explained before in connection with similar diagrams.

The manner in which the arrangement of Fig. 13 responds to a change in speed, compared to the action of the arrangements previously described, in shown in Fig. 15. It is seen that while the former arrangements, after the transients have died out, comes to rest in a new phase position, the system just described remains in an out-of-phase position just long enough for $C_3$ to acquire the proper potential, then settles down in the same position which it occupied before the change in speed occurred.

Figure 16:
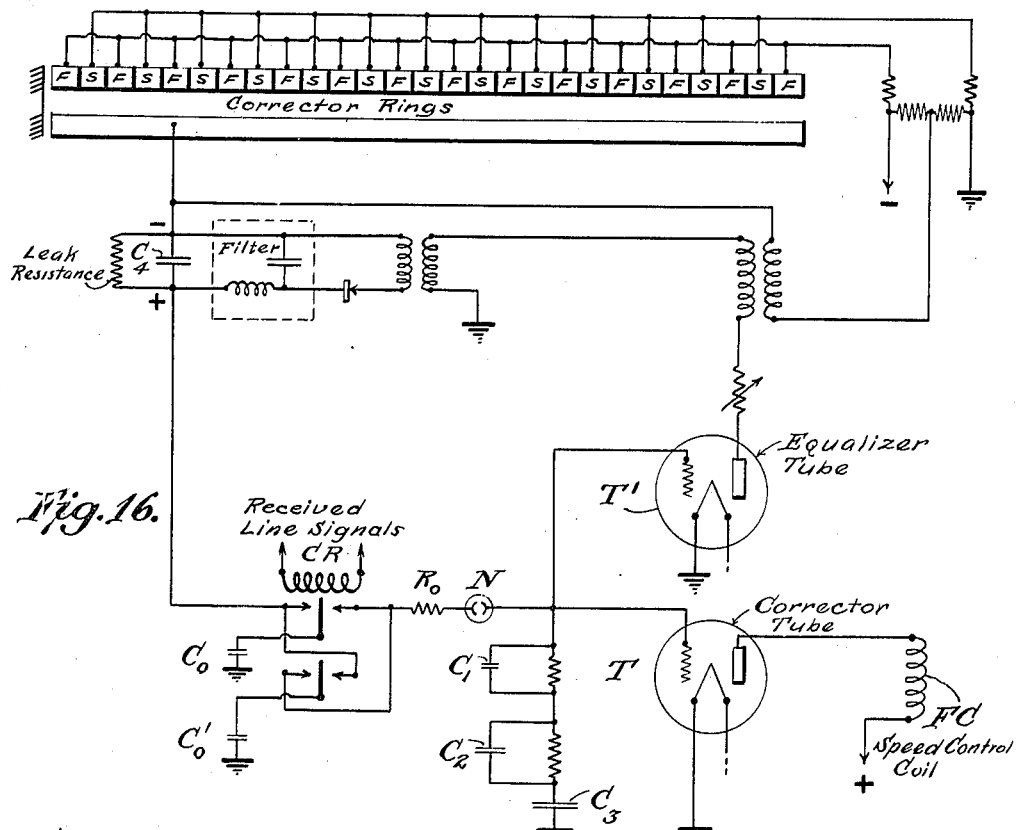

Fig. 16 shows an alternative method of accomplishing the same result. The principle is the same, namely, to keep the voltage to which $C_0$ and $C'_0$ are charged always symmetrical with respect to the voltage of $C_3$. Different means are, however, employed to furnish the equalizing voltage. A second tube $T'$ is employed, having its plate circuit energized by an A. C. source. (The figure shows this being obtained through a transformer from the correcting ring.) Since the plate impedance is under control of the grid potential, (obtained from the same source as the corrector tube) a second transformer connected into the plate circuit can be made to produce an A. C. voltage approximately linear with respect to the voltage on the grid. The alternating EMF so obtained is then rectified, and filtered, and made to keep $C_4$, connected in series with the lead from the solid correcting ring, at the proper voltage to equalize the correcting pulses. The leak resistance is for the purpose of providing a path for $C_4$ to discharge when a reduction in its voltage is required.

It should be noticed that since the voltage of $C_4$ is maximum when the grid voltage is at ground potential, it is oppositely poled to the D. C. generator (Fig. 13) and assymmetrical voltages are applied to the correcting segments. The same principle could be employed with the generator, thereby obviating the necessity of a double field winding.

I have illustrated and described several circuit arrangements embodying my invention for the purpose of clearly disclosing the underlying principles and the manner in which they may be carried out in practice but it will be evident to engineers that other modifications can be made within the purport of my claims.

I claim:

1. A system for synchronizing an oscillatory device with a series of received impulses, which comprises instrumentalities for producing incremental correcting impulses of one polarity or the other, depending upon the phase relation of the oscillations of said device and the received impulses, correcting means including a plurality of circuits having different time constants, each circuit embodying a storing condenser and the input circuit of a thermionic tube, and means including the output circuits of said tubes for utilizing the resulting potential charges on said condensers to correct any departure in phase relation between the oscillations of said device and said received impulses.

2. A system for synchronizing an oscillatory device with a series of received impulses, which comprises instrumentalities for producing incremental correcting impulses of one polarity or the other depending upon the phase relation of the oscillations of said device and the received impulses, correcting means including thermionic tubes and a plurality of circuits having different time constants, each circuit embodying an ionizable gaseous gap, a storing condenser and the input circuit of a thermionic tube, and means including the output circuits of said tubes for utilizing the resulting potential charges on said condensers to correct any departure in phase relation between the oscillations of said device and said received impulses.

3. A system as defined in claim 2, said output circuits being arranged to successively exert greater control upon said oscillatory device.

4. A system for synchronizing an oscillatory fork with a series of received impulses, which comprises instrumentalities for producing a series of incremental correcting impulses corresponding to changes of polarity of the incoming impulses, means for applying said correcting impulses to a plurality of circuits, each including a vacuum tube element, and means including said circuits whereby each of said impulses produces an effect upon said fork which is nil, acceleratory or deceleratory in a manner proportional to and depending upon the phase relation of said fork with respect to said produced impulses, said circuits having successively greater potency upon the control of said fork.

5. A system as set forth in claim 1, said control coil being constructed and arranged to maintain any shift in said phase relation within predetermined values, the combined damping effect of said circuits operating to suppress any accumulated corrector speed component in a few half cycles of oscillation.

6. A system for synchronizing an oscillatory fork with a series of received impulses, which comprises instrumentalities for producing a series of incremental correcting impulses corresponding to changes of polarity of the incoming impulses, means for applying said correcting impulses to a plurality of circuits each including a vacuum tube element, and means including said circuits whereby each of said impulses produces an effect upon said fork which is nil, acceleratory or deceleratory in a manner proportional to and depending upon the phase relation of said fork with respect to said produced impulses, the time constants of said respective circuits increasing progressively and the correcting effect of said tube circuits upon the control of said fork also increasing progressively.

7. A system for synchronizing an oscillatory fork with a series of received impulses, which comprises instrumentalities for producing a series of incremental correcting impulses corresponding to changes of polarity of the incoming impulses, means for applying said correcting impulses to a plurality of circuits, each including a storing condenser and a vacuum tube element, and means including said circuits whereby each of said impulses produces an effect upon said fork which is nil, acceleratory or deceleratory in a manner proportional to and depending upon the phase relation of said fork with respect to said produced impulses, the time constants of said respective circuits increasing progressively and the correcting effect of said tube circuits upon the control of said fork also increasing progressively.

8. A system for maintaining synchronism between a rotary receiving device and incoming signal impulses, comprising a driving motor for said rotary device, an oscillatory fork having a control coil arranged to govern the speed of said motor, an instrumentality responsive to the incoming signals operating in conjunction with said rotating device to produce incremental correcting impulses of polarities depending upon the forward or rearward departure of said device from synchronism, means for accumulating and continuously averaging said correcting impulses including a plurality of circuit paths each embodying a storing condenser and the input circuit of a thermionic tube, said circuit paths having successively greater time constants, and means including the output circuits of said tubes for applying the resulting potential charges on said condensers to said fork control coil to thereby correct any departure in phase relation between the receiving device and the incoming signal impulses.

9. A corrector system comprising the combination of a telegraph line, a rotary distributor, corrector means associated with said distributor, a motor for driving said distributor and an instrumentality for controlling the speed of said motor, said corrector means having a plurality of separate elements of successively greater potency in controlling said instrumentality.

10. A corrector system comprising the combination of a telegraph line, a rotary distributor, corrector means associated with said distributor, a motor for driving said distributor and an instrumentality for controlling the speed of said motor, said corrector means embodying a plurality of vacuum tube circuits operatively connected to control said instrumentality, said circuits having different time constants.

11. A corrector system comprising the combination of a telegraph line, a rotary distributor, a corrector means associated with said distributor, a motor for driving said distributor and an instrumentality for controlling the speed of said motor, said corrector means embodying a plurality of vacuum tube circuits operatively connected to control said instrumentality, said circuits having successively greater time constants and exerting successively greater potency upon said instrumentality.

12. A system for correcting for phase departure in synchronous apparatus, comprising means for receiving a series of impulses with which a local device is to be synchronized, means for driving said device, means for producing an impulse in response to each received impulse of a polarity dependent upon the phase relation of said device with respect to said received impulse, storing means for receiving said produced impulses and means for continuously utilizing the average charge on said storing means to correct the speed of said driving means in a direction tending to restore synchronism.

13. In a synchronous impulse receiving system, a rotating device, an instrumentality responsive to the incoming signal impulses to produce, in conjunction with said rotating device, a single current impulse of a polarity dependent upon the phase relation of said device with the signal impulse, a plurality of connected storing elements of different capacities for utilizing the resultant of said produced impulses to correct the speed of said rotating device upon the occurrence of a slight phase displacement from said received impulses.

14. A corrector system for synchronous telegraph systems, comprising a rotary distributor and a driving motor therefor, an instrumentality for controlling the speed of said motor, and corrector means responsive to received signal impulses and embodying a thermionic tube having its output circuit connected to said instrumentality, a plurality of circuit networks connected to the input circuit of said tube having different time constants, the summation of which provides an average corrector component to said input for maintaining said motor speed in synchronism and proper phase relation with said received impulses substantially irrespective of changes in line signal frequency.

15. In a corrector system as defined in claim 14, means for maintaining the correcting impulses invariable in magnitude, changing only in sign, whereby constant phase position of the distributor brushes will be maintained for any speed within the linear range of the system.

PAUL A. NOXON.